(No Model.) 2 Sheets—Sheet 1.

E. H. SUHL.
PLANTER.

No. 507,048. Patented Oct. 17, 1893.

Witnesses
Geo. E. Fuch.
Roland A. Fitzgerald.

Inventor
E. H. Suhl
By Lehmann Patterson & Kehrt
attys (No Model.) 2 Sheets—Sheet 2.

E. H. SUHL.
PLANTER.

No. 507,048. Patented Oct. 17, 1893.

Witnesses
Geo. E. Frech
Roland A. Fitzgerald

Inventor
E. H. Suhl
By Lehmann Pattison & Nesbit
attys

UNITED STATES PATENT OFFICE.

EDWARD H. SUHL, OF PENINSULAR, OREGON.

PLANTER.

SPECIFICATION forming part of Letters Patent No. 507,048, dated October 17, 1893.

Application filed May 24, 1893. Serial No. 475,329. (No model.)

*To all whom it may concern:*

Be it known that I, EDWARD H. SUHL, of Peninsular, in the county of Multnomah and State of Oregon, have invented certain new and useful Improvements in Planters; and I do hereby declare the following to be a full, clear, and exact description of the invention, such as will enable others skilled in the art to which it pertains to make and use it, reference being had to the accompanying drawings, which form part of this specification.

My invention relates to an improvement in planters, and it consists in the novel features of construction which will be fully described hereinafter and especially pointed out in the claims.

The object of my invention is to provide an improved planter which may be readily attached to a cultivator or plow for the purpose of replanting, while the crop is being worked or cultivated, thus avoiding the expense incident to the ordinary method of replanting.

Figure 1:
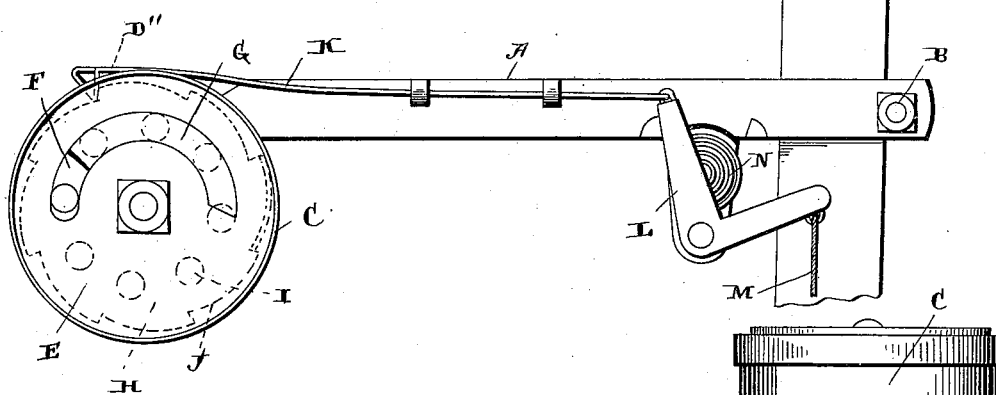
Figure 2:
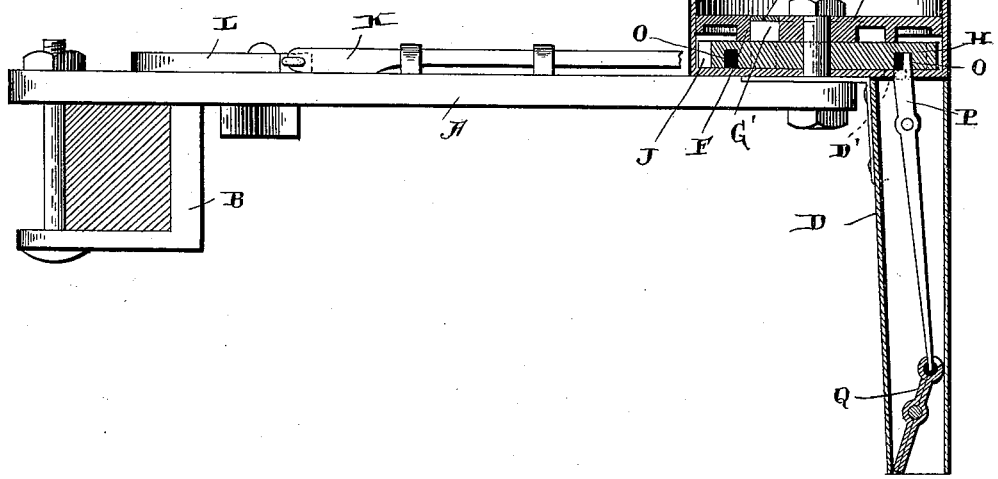
Figure 3:
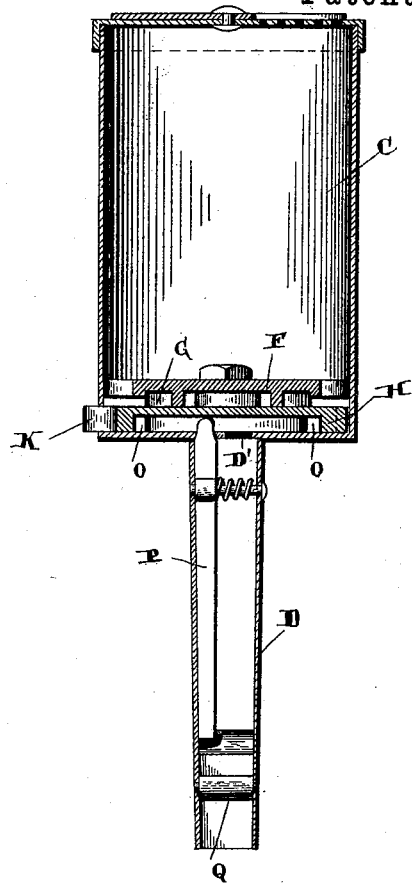
Figure 4:
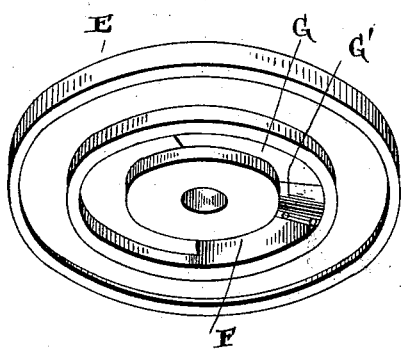
Figure 5:
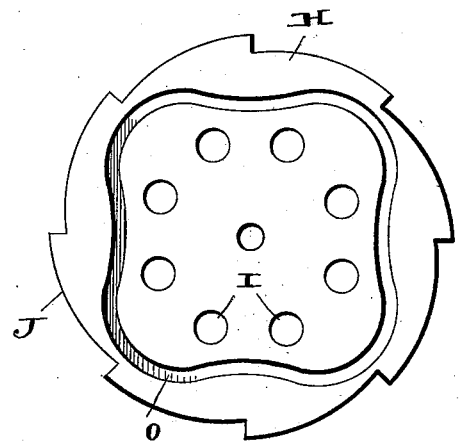

Referring to the accompanying drawings, Figure 1, is a plan view of my improved planter attached to a cultivator. Fig. 2, is a side elevation of the planter. Fig. 3, is a vertical sectional view of the same. Fig. 4, is a detached view of the bottom of the hopper. Fig. 5, is a similar view of the perforated dropping disk.

A designates an arm or support provided at its inner end with clamp B, where it is secured to the cultivator or plow. Upon the outer end of the arm is the hopper C, and depending therefrom is the planting tube D.

The bottom E of the hopper is formed with a segmental groove F, and occupying a portion of this groove F is a spring arm cut off G, which at its free end is provided with depending stops G', for the purpose presently to be explained.

Beneath the bottom E is the revoluble dropping disk H provided with a series of openings I arranged concentrically so that when the said disk is revolved these openings are brought beneath the segmental slot F. By means of this arrangement the seed is dropped through the slot F and into the openings I of disk H, and by them carried to the entrance D' of planting tube D. The spring arm G with its stop G' serves to prevent more than a given amount of seed from passing to the said tube, and by this means the amount planted is readily regulated. The periphery of disk H is formed with the ratchet notches J which are exposed to openings D' in the lower end of hopper C, where they are engaged by the outer end of the longitudinally movable dog K, which extends inward over the arm A where it is secured to the end of the bell crank lever L, which latter at its opposite end is provided with the operating cord M leading to the handle of the cultivator and in convenient reach of the operator. A coiled spring N beneath lever L and connected thereto serves to hold the latter in such a position that the dog K is normally pushed outward in engagement with one of the notches J of disk H and thus ready to turn the same when drawn upon by the operator.

In the under face of disk H is formed the cam groove O and projected thereinto is the upper end of lever P, which latter is fulcrumed near the upper end of tube B. The lower end of this lever engages the upper end of a pivoted valve Q which obstructs the lower end of tube B and prevents the seed from discharging therefrom until the same is shifted by the said lever. The cam groove O is formed that by one movement of the disk H by dog K, the upper end of the lever P, will be pushed inward the limit of its movement and the next turn of the said disk will serve to push the lever outward, so that at every partial revolution of the disk H the valve Q is opened and closed. Thus it will be seen that when the operating line is drawn upon the said valve is immediately opened and the seed resting thereon is allowed to drop, while as soon as it is again closed it receives a deposit of seed from the dropping disk, ready to be dropped into the ground at the next movement of the operator.

A planter constructed as herein shown and described is positive in its operation, accurate as to the number of seeds dropped, and by its use I am enabled to replant while effecting the first working of the crop.

Having thus described my invention, what I claim, and desire to secure by Letters Patent, is—

1. An improved planter comprising a hopper, a perforated disk revoluble beneath the same, a means for operating the disk, a tube depending from the hopper into which the said disk discharges, the said disk being formed with a cam groove on its under side, and a valve in the tube, a lever engaging the valve and projecting into the said groove, substantially as shown and described.

2. The combination of a planting disk having a cam groove in its under side, a means for revolving the same, a seed tube, a valve, and a valve operating mechanism in engagement with said groove, substantially as shown and described.

3. The combination of a revoluble planting disk having a continuous cam groove in its under side, a seed tube, a valve therein, a lever pivoted between its ends within the tube and engaging at its lower end the valve and at its upper end the groove in the disk substantially as shown and described.

In testimony whereof I affix my signature in presence of two witnesses.

EDWARD H. SUHL.

Witnesses:
   GEO. S. KINGSBURY,
   JOS. B. TIERNEY.